United States Patent
Clausi et al.

(10) Patent No.: US 11,673,384 B2
(45) Date of Patent: Jun. 13, 2023

(54) TRANSFER FILM AND MEMBRANE COVERINGS FOR PANEL PRODUCTS

(71) Applicants: Robert N. Clausi, Oakville (CA); Salvatore A. Diloreto, Ancaster (CA)

(72) Inventors: Robert N. Clausi, Oakville (CA); Salvatore A. Diloreto, Ancaster (CA)

( * ) Notice: Subject to any disclaimer, the term of this patent is extended or adjusted under 35 U.S.C. 154(b) by 461 days.

(21) Appl. No.: 16/497,867

(22) PCT Filed: Mar. 26, 2018

(86) PCT No.: PCT/CA2018/050361
§ 371 (c)(1),
(2) Date: Sep. 26, 2019

(87) PCT Pub. No.: WO2018/176128
PCT Pub. Date: Oct. 4, 2018

(65) Prior Publication Data
US 2020/0101710 A1 Apr. 2, 2020

Related U.S. Application Data

(60) Provisional application No. 62/477,147, filed on Mar. 27, 2017.

(51) Int. Cl.
*B32B 37/00* (2006.01)
*B32B 9/00* (2006.01)
(Continued)

(52) U.S. Cl.
CPC ............ *B32B 37/025* (2013.01); *B27N 7/005* (2013.01); *B32B 9/005* (2013.01); *B32B 15/06* (2013.01);
(Continued)

(58) Field of Classification Search
CPC ....... B32B 37/025; B32B 37/26; B32B 37/10; B32B 15/06; B32B 21/045;
(Continued)

(56) References Cited

U.S. PATENT DOCUMENTS

2011/0073253 A1    3/2011  Clausi
2011/0247748 A1*  10/2011  Pervan .................... B05D 7/06
                                                                 156/220

(Continued)

FOREIGN PATENT DOCUMENTS

CA      2944698       8/2015
KR     2013121254     6/2013
(Continued)

OTHER PUBLICATIONS

International Search Report issued in PCT/CA2018/050363, dated May 29, 2018, pp. 1-3.

(Continued)

*Primary Examiner* — John L Goff, II
(74) *Attorney, Agent, or Firm* — Jeffrey S. Melcher; Melcher Patent Law PLLC

(57) ABSTRACT

A membrane covered panel and a membrane covered panel production method are provided wherein an elastomeric membrane, and preferably, an aqueous elastomeric resin-based membrane, is applied to a finished panel construct, prior to pressing of the membrane covered panel. The method is used to produce panels which can be used in the production of flooring materials, wall panels, furniture, countertops, and the like. The membrane is applied to a transfer film, which transfer film can be removed at any time prior to, or after the pressing operation. The panels produced have a durable but elastic surface which can protect the surfaces of the panel construct. The elastomeric covering on the panel construct also preferably provides a surface which (Continued)

is abrasion resistant, and provides better acoustical properties while providing a soft touch haptic surface.

18 Claims, 5 Drawing Sheets

(51) Int. Cl.

| | |
|---|---|
| *B32B 15/06* | (2006.01) |
| *B32B 17/06* | (2006.01) |
| *B32B 21/02* | (2006.01) |
| *B32B 21/04* | (2006.01) |
| *B32B 25/08* | (2006.01) |
| *B32B 37/26* | (2006.01) |
| *C08J 5/18* | (2006.01) |
| *E04C 2/26* | (2006.01) |
| *B32B 38/00* | (2006.01) |
| *B27N 7/00* | (2006.01) |
| *B32B 37/24* | (2006.01) |
| *B32B 37/10* | (2006.01) |
| *B32B 38/10* | (2006.01) |
| *B27N 3/20* | (2006.01) |

(52) U.S. Cl.
CPC ............ *B32B 17/063* (2013.01); *B32B 21/02* (2013.01); *B32B 21/045* (2013.01); *B32B 25/08* (2013.01); *B32B 37/26* (2013.01); *B32B 38/164* (2013.01); *C08J 5/18* (2013.01); *E04C 2/26* (2013.01); *B27N 3/203* (2013.01); *B32B 37/10* (2013.01); *B32B 38/10* (2013.01); *B32B 2037/243* (2013.01); *B32B 2037/268* (2013.01); *B32B 2307/412* (2013.01); *B32B 2309/02* (2013.01); *B32B 2309/04* (2013.01); *B32B 2309/105* (2013.01); *B32B 2309/12* (2013.01); *B32B 2419/04* (2013.01); *C08J 2375/04* (2013.01); *C08J 2433/04* (2013.01)

(58) Field of Classification Search
CPC ........ B32B 2037/243; B32B 2037/268; B32B 2309/02; B32B 2309/04; B32B 2309/105; B32B 2309/12; B32B 38/164; B32B 38/10; B32B 38/06; C08J 5/18; C08J 2375/04; C08J 2433/04; B27N 3/203; B27N 7/005; B44C 1/1712; B05D 1/286
USPC ........................................................ 156/231
See application file for complete search history.

(56) References Cited

U.S. PATENT DOCUMENTS

| | | | |
|---|---|---|---|
| 2012/0103722 | A1 | 5/2012 | Clausi |
| 2012/0267042 | A1* | 10/2012 | Okafuji ..................... B32B 7/02 |
| | | | 156/230 |
| 2012/0276348 | A1 | 11/2012 | Clausi |
| 2014/0196982 | A1 | 7/2014 | Clausi |
| 2014/0295159 | A1* | 10/2014 | Kawasaki ............ H05K 1/0306 |
| | | | 428/216 |
| 2014/0302308 | A1* | 10/2014 | Ho ............................ C09J 7/25 |
| | | | 428/323 |
| 2017/0321416 | A1 | 11/2017 | Clausi |
| 2018/0222169 | A1 | 8/2018 | Clausi |

FOREIGN PATENT DOCUMENTS

| | | | |
|---|---|---|---|
| KR | 2013121254 A | * | 11/2013 |
| KR | 2014060765 | | 5/2014 |
| KR | 2014060765 A | * | 5/2014 |
| WO | 2011043361 | | 4/2011 |
| WO | 2018/045466 | | 3/2018 |

OTHER PUBLICATIONS

Written Opinion issued in PCT/CA2018/050363, dated May 12, 2018, pp. 1-9.

* cited by examiner

TRANSFER FILM AND MEMBRANE COVERINGS FOR PANEL PRODUCTS

FIELD OF INVENTION

The present invention relates to a covered panel and to a covered panel production method. In particular, the present invention relates an approach wherein a pre-existing panel construct is covered with a membrane of an elastomeric material which has been applied to the surface of the panel construct. The membrane can be applied as a stand-alone product, or the membrane can be applied together with an optional transfer film which can be subsequently removed. The resultant membrane covered panels can be used in the production of flooring materials, wall panels, furniture, countertops, and other such finished products.

BACKGROUND OF THE INVENTION

Construction panels used in the manufacture of flooring, wall panels, furniture, countertops, and the like, are currently made in different ways. These types of panels are well known in the art, and it is these finished "panel constructs" that are of particular interest in the practice of the present invention.

In a first type of panel construct, veneers, or multi-layer glued wood veneer layers are assembled to form plywood or engineered wood panels. The wood veneer, or the multi-layer wood veneer plywood layers may be uni-directional or may have alternating adjacent layers so as to achieve better structural stability and have improved resistance to moisture.

Another type of panel construct include composite core panels which are produced by blending wood chips, fibres, strands and/or particles, together with a resin, and forming a mat of the resin coated materials. The resultant mat is then pressed under heat and pressure in order to form and then cure the panel. Examples of these types of composite core panels are boards such as particleboard, MDF (medium density fibreboard), HDF (high density fibreboard), OSB (oriented strand board), or the like.

Additional types of panel constructs are wood veneer panels which are prepared by adhering a wood veneer layer to at least one surface of a composite panel using an adhesive.

Another common type of panel construct includes laminated panels which are used in the production of flooring, furniture panels and wall panels. These types of panels typically have a multilayer structure comprised of a core panel, and multiple treated paper layers, on at least one side of the core panel. These types of laminate panels are formed by pressing the various layers under heat and pressure, in one or multiple steps, in order to form the laminate panel and bond the various layers to each other.

Commonly, in these types of laminated panels, the core panel is an MDF or HDF board and the paper layers are typically paper sheets which have been impregnated with a suitable resin material, and then air dried. The resin impregnated paper sheets are placed over the core panel so as to provide the various layers found in a typical laminate panel. The paper layers used in the laminated panels can include layers such as an overlay wear layer, a decorative layer, and a balancing layer. While the exact structure and properties of these panels can vary between manufacturers, most laminate flooring panels include a wear layer and a decorative layer on one side of the core panel, and a balancing layer on the opposite side of the core panel. However, those skilled in the art will be aware that numerous variations on the types of paper layers, and their relative positioning, are known in this field.

Commonly though, the overlay paper wear layer is positioned over the decorative paper layer, in applications such as flooring, so as to act as a protective wear layer where the extra durability of the wear layer would be beneficial. This wear layer can include abrasion resistant particles, such as aluminum oxide, or the like, to provide enhanced durability of the panel surface. When covered by the wear layer, and eventually pressed, the pattern printed on the paper of the decorative layer, is still visible to the user, through the nearly-transparent wear layer.

The wear layer is commonly formed by impregnating a paper sheet with melamine resin which provides a brittle and rigid paper layer. However, the use of other resin technologies is also possible. For example, in US patent publication No. 20120103722 (incorporated herein by reference in its entirety), the inventors have described the use of more flexible, elastomeric resins for impregnating one or more of the paper layers, in order to provide an elastomeric resin impregnated paper, and in particular, an elastomeric polyurethane-based resin, that provides sound attenuating properties, in the finished panel.

In any case, the decorative layer, and the optional wear layer are typically positioned on the upper surface of the core material of a laminated panel in such a manner that the decorative paper provides the laminate flooring with its individual appearance, and the wear layer provides the desired wear resistance.

After pressing of the laminated panel, the resulting finished panels usually have a realistic looking appearance since the design printed on the decorative paper layer is clearly visible.

To enhance the appearance of the laminated panels however, the upper surface of the pressed panels may frequently include an embossed texture which has been applied to the laminated panel during pressing, so as to create a more realistic textured panel surface. This is commonly done using, for example, a register embossing system in the panel press, and this technique is currently well known to those skilled in the art.

Regardless of the production technique, these types of laminated panels are a preferred type of panel construct to be used in the practice of the present invention, as hereinafter described.

Other specialty laminated panels that can also act as panel constructs include panels having a core layer to which a surface layer a material such as of cork, linoleum, pressed wood powders, PVC, or HPL (High Pressure Laminate) materials, or the like, has been bonded.

Also, panel constructs can be produced wherein the panel construct is produced by simply printing a pattern directly on to the upper surface of a core panel.

Additionally, other types of panel constructs that might be used in this art include panels having a core material comprised of one or more layers of a plastic material. This includes panels having a core layer made of, for example, polyvinyl chloride (PVC), or the like. This includes products such as luxury vinyl tiles (LVT), vinyl planks, and the like.

Additional panel constructs can be prepared using panels having a composite core layer which includes panels having a core of one or more layers of paper or plastic material combined with various fillers, and the like. This approach includes panels such as linoleum, WPC (wood plastic composites) panels, and other such products. In these products, a paper or plastic layer is provided, and printed plastic decorative films are commonly included during pressing, on the top and/or bottom of the core layer, in order to provide the desired appearance or to provide some structural benefit. Once again, during pressing, texture may be provided to the panel during the pressing operation in order to provide a more realistic textured panel, tile or plank.

The panel constructs can also be solid wood planks or boards (such as dimensional lumber), metal panels, glass panels, ceramic or porcelain panels, plastic panels, and the like. Using all of these techniques, large volumes of panel products are commercially produced and used extensively in the flooring, furniture, and panel construction industries. However, frequently, it is desired to enhance the appearance of these panel constructs, and/or to enhance the properties of these panels, such as, for example, to improve their sound attenuating properties, provide a softer-feeling panel, provide improved resistance to wear or photodegradation, provide improved washability, provide better impact and/or scratch resistance, or the like. However, coating of these materials onto a finished panel construct, is not always easily achieved.

In some instances, the upper and/or lower layers on the exterior surfaces of the panel may be finished with a liquid coating, such as a stain, varnish, paint or other surface treatment material, to add color or a suitable finish, to the wood. These are usually air-dried, but low temperature heating (e.g. less than 50° C.) might also be used. UV cured coating layers might also be added to the panel exterior to protect the panel from exposure to the elements.

Preferably, a curable coating is used, wherein the coating material includes a polymerizable material, which is polymerization by drying, heating, UV radiation, or the like, in order to form a network of interbonded molecules.

However, application of liquid coatings to the finished panel constructs is typically complicated and requires a finishing line. Depending upon the type of substrate that needs to be coated, the finishing line may include many processing steps including, sanding, application of a sealing coat, curing of said sealing coat, sanding the sealed surface, application of a stain, curing of the stain, brushing the stained surface to smooth the surface, and subsequently applying up to 10 separate UV curable coatings.

This coating operation is therefore excessively complex, and additionally, UV coating conditions, can lead to degradation of the underlying, substrate panels.

Thus, while a wide variety of materials and techniques are currently known for coating finished panel constructs, it would be beneficial and advantageous to this industry to provide an approach for creating improved, enhanced, or altered covered panel constructs that have improved, enhanced or altered appearance, feel, sound attenuating properties, texture, and/or wear capabilities. As such, it would be advantageous and beneficial to the industry to provide an alternative method for covering these prior art panel constructs in order to provide panel constructs having improved, enhanced or altered properties.

SUMMARY OF THE INVENTION

Accordingly, the present invention provides a covered panel, wherein the covered panel has improved, enhanced or altered appearance, texture, and/or wear capabilities, when compared to traditional finished panel constructs.

The present invention also includes a covered panel having a softer, and preferably, haptic feel, and which also provides improved sound attenuating properties over prior art panel constructs.

The present invention additionally includes a method for the production of covered panels having improved or enhanced appearance, feel, sound attenuating properties, texture, and/or wear capabilities, when compared to traditional panel product constructs.

The advantages set out hereinabove, as well as other objects and goals inherent thereto, are at least partially or fully provided by the covered panel and a covered panel production process of the present invention, as set out herein below.

Accordingly, in a first aspect, the present invention includes a process for the production of a covered panel comprising applying a resin-based membrane to a surface of a panel construct so that said membrane is adjacent to a surface of said panel construct, and pressing the resultant membrane covered panel construct, under conditions of heat and pressure, for sufficient time to cure and/or crosslink said membrane resin material, and thereby bond said membrane to the surface of the panel construct.

In a preferred approach, the membrane is produced from one or more layers of a resin-based material which has been applied to a transfer film, preferably with drying of each of the layers of resin material after each resin layer application, in order to produce a membrane covered transfer film. The membrane covered transfer film is then subsequently applied to the surface of a panel construct in a manner such that the membrane is adjacent to the surface of the panel construct.

Alternatively, in a separate approach, the membrane is separated from the transfer film in order to produce a transfer film-free membrane. This transfer film-free membrane can also applied to the surface of a panel construct so that the membrane is adjacent to the surface of the panel construct.

The membrane covered panel construct, either with or without the transfer film, is then preferably pressed under conditions of heat and pressure, for sufficient time to cure and crosslink the membrane, and bond the membrane to the surface of the panel construct.

The membrane covered panel can be used, as is, or cut to a desired size, in order to produce the desired size of panel products. Additionally, the membrane covered panels can be used, as is, or they can be subsequently affixed to another panel or panel construct, using, for example, a glue or other adhesive.

The resin material used for the membrane of the present invention can be any suitable resin material. This includes resin materials based on plastic-based materials, melamine-based materials, acrylic-based materials, or the like, but most preferably, is a resin material based on a polyurethane based material. As used herein, the term "based on" means, utilizing or including, as a substantial or majority component (preferably at least about 25%, more preferably at least about 40%, even more preferably greater than 50%, and most preferably greater than about 60%), such as by weight or by volume.

Preferably, the resin material used in the production of the membrane, is an elastomeric resing based material. While an essentially 100% solids material can be prepared by extrusion, or by extrusion onto a transfer film, preferably, the resin material is used as a solution or dispersion of an elastomeric resin in water or in another suitable solvent. More preferably, the resin material is a water-borne solution or dispersion of an elastomeric resin, and in particular, is a water-borne solution or dispersion of an elastomeric polyurethane-based resin. Further, while the covering material membrane can be opaque or translucent, tinted or coloured, preferably, the resin selected is one which provides a clear, colourless, transparent covering on the surface of the panel construct. Accordingly, the covering material is most preferably an aqueous, elastomeric polyurethane-based resin solution or dispersion, which dries and cures to a clear, colourless, transparent coating.

The resin material used in production of the membrane, is therefore preferably a liquid material supplied as a waterborne or solvent borne solution, latex, emulsion or dispersion, which is sprayed onto, or spread over the transfer film, using for example, a spray coater, curtain coater, dip coater, vacuum coater, roll coater or the like. Numerous layers of the resin material can be applied to build up the thickness of the membrane. However, when more than one layer is applied, the applied layers of the covering material membrane are preferably dried before the next layer is applied. While the membrane can be prepared from a single layer of resin material, preferably at least two layers of the resin material are applied to the transfer film.

The layers of the resin material are preferably dried to remove any solvents or moisture. This is typically accomplished by air-drying each of the applied layers at ambient temperature, or by drying each of the applied layers in an oven at a relatively low temperature (e.g. less than 130° C., more preferably less than 100° C., and still more preferably, at temperatures of less than 60° C.), in order to avoid or minimize any curing of the applied resin material. The particular temperatures of the drying step can be modified, based on the particular composition of that particular layer, as different compositions may cure under different drying conditions.

Combinations of drying conditions can be used, but drying is typically accomplished over a short time period of, for example, between 30 seconds and 5 minutes, for each layer, but this length of time can vary depending on the conditions (e.g., temperature, humidity and the like) encountered during the drying operation.

Once the first applied resin material layer applied to the transfer film is dried, additional layers of resin material can be applied to the previous layer, with drying of the resin material after the application of each layer. This process can be repeated until the desired thickness, and/or amount, of resin material has been achieved, and the membrane has the desired thickness. While multiple application and drying steps are described, in a most preferred embodiment, the resin material is applied to the desired thickness and subsequently dried, so that only one application and drying step is required.

When the desired thickness or amount of resin is achieved, the membrane can be separated from the transfer film for use as a stand-alone membrane, or the combined membrane and transfer film can be left affixed to the transfer film to allow for, for example, easier handling or processing of the membrane. In either case, the membrane can now be applied to the surface of the panel construct.

Once the membrane has been applied to the surface of the panel construct, in accordance with the present invention, the membrane covered panel construct is placed into a press and pressed under conditions of heat and pressure in order to crosslink and cure the resin of the membrane, and thereby bond the resin material of the membrane, to the surface of the panel construct. By using this technique, a resin-based layer of the membrane is permanently affixed to the surface of the finished panel construct so as to provide a panel having improved, enhanced or altered appearance and/or performance properties.

Also, while use of a single membrane is preferred, it should be clear that the use of multiple membranes is not excluded from the present invention. These multiple membranes can be additional layers of the same membrane, or can be membranes having a different composition. In this multiple membrane option though, it will be clear that only the outer membrane layer will optionally include a transfer film, during pressing.

Also, it can be noted that a solvent-free material can be used to directly prepare the membrane, by using a suitable extruder, to extrude a suitable resin mixture (with or without a transfer film), and thus provide an essentially 100% solids membrane which can be applied to the panel construct in the manner previously described.

The transfer film used in the practice of the present invention can be any suitable film material, or the like, which temporarily adheres to the resin forming the membrane material, both before and after the pressing operation. That is, the transfer film is preferably selected so that it will not be permanently affixed to the membrane during production of the membrane covered transfer film, nor to the pressed covered panel.

As a result, the transfer film can preferably be easily removed from the membrane prior to pressing, or if the transfer film is present during the pressing operation, the transfer film is selected so that it will not be made permanently adherent to the membrane during the pressing operation, and can be easily removed from the pressed covered panel.

As a result, since the transfer film is preferably not permanently affixed to the membrane material either before or after pressing operation, the transfer film can be peeled, or otherwise separated from the membrane material, at any suitable time.

However, the transfer film does not need to be immediately removed from the pressed, membrane covered panel. In fact, in one preferred embodiment, the transfer film remains on the membrane covered panel until after installation or use of said membrane covered panel. In this approach, the membrane covered panel product is covered with the transfer film at all times, up to final installation or use of the product. As a result, the transfer film may act as a protective layer for the membrane covered panel during further production stages, or during storage, shipping or even installation or use of the membrane covered panel product.

Alternatively, the membrane can be separated from the transfer film after the membrane has been formed on the transfer film, and prior to application of the membrane on the surface of the panel construct. The membrane alone can then be used, as is, or it can be kept in storage and applied to the panel construct at a later time. In this alternative approach, the membrane is separated from the transfer film, and then rolled into a continuous roll, or cut into sheets. The membrane alone (without the transfer film) can then be applied directly to the panel construct, so that the membrane covered panel can then be pressed in a press under conditions of heat and pressure, in order to cure and crosslink the membrane, and thereby bond the membrane to the surface of the panel construct.

Preferably the transfer film is made from a material which allows it to be separated from the membrane without any damage to the membrane material, or the transfer film itself. This allows the transfer film to be re-used for subsequent membrane production operations.

The resin material can be applied to the transfer film in a batch process so as to produce a membrane sheet that can be applied to a sheet of the panel construct. In a preferred embodiment however, the membrane covered transfer film is produced in a continuous process, by applying the resin-based material to a continuous transfer film layer. After drying, the membrane covered transfer film can be rolled up into a membrane roll, and used in this fashion, or the membrane can be separated from the transfer film, and used in this fashion.

The membrane covered transfer film, or the membrane alone, can be applied to the panel construct by placing the membrane material (with or without transfer film) over the panel construct, and then pressing the membrane covered panel construct.

Optionally, the membrane roll can also be cut into smaller rolls, or the membrane roll can be cut into membrane sheets and used in that fashion.

Once the membrane has been applied to the surface of the panel construct, the membrane covered panel construct, is pressed under heat and pressure to effect crosslinking and curing of the resins in the membrane material, and thereby bond said membrane material to the panel construct surface. In one embodiment, the pressing step may be continuously conducted using, for example, a heated calendaring roller in order to apply the necessary heat and pressure to cause the elastomeric resin of the membrane to flow and bond to the panel construct. In another approach, sheets of the membrane material are pressed, using a batch pressing device (or a short cycle press), to cause the elastomeric resin of the membrane to flow and bond to the panel construct. In either case, a membrane covered panel is produced.

Thus, in a first production stage of a preferred embodiment, a membrane of a preferably water-based elastomeric resin material is produced by applying the resin material to the surface of a transfer film, e.g., by means of a roll-coater, spray coater, knife coater, curtain coater, vacuum coater, dip coater, or the like. After applying a desired amount of the resin material, the resin material layer is dried to remove the solvent or water and leave only a deposit film of elastomeric solids. Multiple applications of the resin material, and drying steps may be used as necessary or as desired, in order to build up a desired film build of elastomeric solids on the transfer film. The membrane covered transfer film is then positioned adjacent to a panel construct so that the membrane is located adjacent to a surface of the panel construct.

In a second production stage of this embodiment, the membrane covered transfer film and panel construct combination is placed in a hot press and pressed. The heat and pressure from the press allow the elastomeric solids from the membrane to flow over the surface of the panel construct and bond with the substrate of the panel construct. This process provides the membrane covered panel of the present invention, and the applied membrane provides the improved properties to the membrane covered panel constructs.

After pressing, the resultant pressed, membrane covered panel is removed from the press and allowed to cool, either by, for example, application of a cooling environment or simply by removing from the hot press. After cooling, the resultant covered panel may be used as is, or cut into flooring tiles or planks which may be further machined where necessary or desired, so as to include a suitable joining system or the like.

Additionally, it should be noted that during pressing, the heated press may include either a smooth press plate ora textured press plate, and the smooth or textured surface of the plate will be transferred to the surface of the covered panel. The texture applied by the press, may be any suitable or desired pattern including a wood grain pattern, a geometric pattern, or the like, or even a flat or piano-finish, as is known in the art. The texture plate may also be designed to emboss the panel surface with any suitable or desired embossing pattern. Moreover, the texture applied may be opposite, complimentary, in alignment with, or "in register" (as is known in the art), with an underlying image or surface of the underlying panel ora portion or segment thereof.

Generally, the gloss level of the finished panel can also be affected by the surface of the press plate. The surface characteristics of the transfer film can also affect the gloss of the finished panel. Additionally, flattening agents might also be added to the composition to reduce the gloss level. Still further, a release paper might also be used to provide the covered panel with the desired texture or gloss (particularly if the transfer film has been removed prior to pressing), and this may be achieved by placing the release paper over the membrane of the membrane covered panel construct prior to pressing.

The panels produced by this process are also of interest, and thus, the present invention is therefore also directed to the resultant covered panels produced by this process. As such, in a further aspect, the present invention also provides a covered panel comprising a pre-existing, panel construct having a covering of a resin-based membrane layer on at least one surface of the panel construct, wherein said resin-based membrane layer has been bonded to the surface of the panel construct by pressing said membrane covered panel construct, under heat and pressure, in order to form the covered panel.

The transfer film preferably remains on the membrane and continues to be temporarily adhered to the membrane. However, at any suitable time, the transfer film can be removed from the membrane.

In one particularly preferred exemplary implementation of the process of the present invention, a laminated panel is selected as a panel construct. This laminated panel is preferably one which includes an HDF core layer covered on one side by a resin-impregnated paper decorative layer (or décor), and a resin-impregnated paper overlay wear layer, and on the other side of the core layer, a resin-impregnated paper backing (or balancing) layer, and this laminated panel has been pressed under heat and pressure to form the panel construct to be used in the practice of the present invention.

DETAILED DESCRIPTION OF THE INVENTION

The panel construct to be used in the production of a covered panel, and in the manner described in the present invention, can be any material currently used as panel product. This includes all of the panel products listed hereinabove as panel constructs, but in particular, includes panels such as particleboard, MDF (medium density fibreboard) board, HDF (high density fibreboard) board, OSB (oriented strand board), a multi-layer glued wood veneer applied to plywood or engineered wood panels or applied to the surface of a composite panel, laminated panels for use in the production of flooring, furniture panels and wall panels, panels having a core layer to which a surface layer of a material such as cork, linoleum, pressed wood powders, an HPL (high pressure laminate) or DL (direct laminate) material, or a PVC based panel, a panel produced by direct printing of a pattern directly on to the upper surface of another panel, a panel construct based on panels having a core material comprised of one or more layers of a plastic material, a luxury vinyl tile (LVT), a vinyl plank, or a WPC (wood plastic composites) panel.

Most preferably however, the panel construct is a laminated or solid panel, or a wood veneer panel. Thus, in one particularly preferred embodiment of the present invention, a laminated flooring panel is selected as the panel construct, and this panel construct is covered with an elastomeric resin membrane. Most preferably, the panel construct is a laminated flooring panel of the type having an HDF or MDF core layer covered on one side by a resin-impregnated paper decorative layer and optionally a resin-impregnated paper overlay wear layer, and on the other side of the core layer, a resin-impregnated paper backing layer which backing layer is provided for structural stability.

During production of this preferred type of panel construct, it will be noted that the assembled layers of the laminated flooring panel are pressed under heat and pressure to form the panel construct to be used in the practice of the present invention. Once formed, the laminated flooring panel, as the panel construct, is ready to be covered with the elastomeric resin membrane in a further pressing operation, under heat and pressure.

In one embodiment, the panel construct can be similar to a HPL laminate. Herein, a core material (preferably MDF or HDF) is pressed simultaneously with (a) a décor paper (which contains a printed image and has been treated with a, preferably, melamine resin), (b) an overlay paper (which preferably has been treated with a melamine resin and contains abrasion resistant particles), a (c) balance layer, and (d) the membrane of the present invention positioned between the upper most layer and a press plate (with or without the transfer film as described herein). This layered structure can be pressed in a single pressing step under heat and pressure to join the various layers together at one time. Because the membrane is positioned between the abrasive overlay and the press plate, the press plate is subjected to significantly less, if even any, risk of abrasion. This feature eliminates the need to frequently replace expensive press plates which will not wear from abrasion. This particularly useful when the desired texture is a super-high gloss, or piano finish.

Alternatively, the core material can be pressed with the décor paper and overlay in a first pressing step, and then the membrane of the present invention can be applied in a second pressing step. Because the texture or surface properties of the resulting finished product are created during the second pressing step, the press plate used in the first pressing step need not contain the inverse of the final texture/structure.

The panel construct can have a smooth or textured surface prior to the application of the membrane of the present invention. However, the covered panel surface can be smooth, or the textured or embossed surface on the membrane covered panel material can have a deeper texture or appearance, due to the possibility of having a thicker coating material layer.

Preferably, the resin material used to prepare the membrane is a semi-flexible or flexible elastomeric resin material, and most preferably, is a semi-flexible or flexible polyurethane-based resin material.

The elastomeric resins of interest in the production of the resin materials used in the present invention preferably comprise natural and/or synthetic resins, or combinations thereof, having elastomeric properties. This includes one component or multi-component; thermoset, thermoplastic (for example, a TPE—thermoplastic elastomer)), solution polymer or water-based or solvent-based suspensions, dispersions and latexes. Either block or alternating or random copolymers may be used. The said material can be based on, but not limited to the following polymers, namely: Polyurethane, polyethylene or polypropylene-based resins; Ethylene vinyl acetate; Ethylene vinyl alcohol; Polyesters; Polyolefin (including TPO); modified Melamine-based thermoset resins; Urea and Urea modified resins; ESI (ethylene styrene interpolymer), or any of the styrene acrylic copolymers and Acrylic resins; rubber based materials such as NBR (nitrile Butadiene), SBR (styrene butadiene), CR (chloroprene), silicone, fluorocarbon, acrylamide, epichlorohydrin, and/or carboxylated, natural and synthetic latexes; or combinations thereof. The elastomeric resin can be made from any of the above materials, or combinations thereof, and used in any suitable liquid form suitable for producing the membrane used to prepare the membrane covered panel. Preferably, the resin material is based on an elastomeric polyurethane resin which resin is preferably provided as a water-borne solution or dispersion of the polyurethane resin. More preferably, the elastomeric resin is a water based, polyurethane resin, and in particular, a water based, UV-resistant, aliphatic polyurethane resin.

Most preferably, the resin material is an elastomeric polyurethane resin which resin material is preferably provided as a water-borne solution or dispersion of the polyurethane resin.

The total thickness of the membrane produced by applying the elastomeric covering material to the transfer film, is preferably from 1 micron to 10 mm, more preferably from 30 microns to 3 mm, and still more preferably, from 50 microns to 1 mm. However, thinner or thicker membranes might also be used. The dried elastomeric membrane is preferably applied at a level of between 3 to 300 grams per square meter, more preferably between 10 and 100 grams per square meter, and most preferably between 40 and 80 grams per square meter. These properties can be adjusted, depending on the desired characteristics of the finished product.

Further, it should be noted that while the membrane can be opaque or translucent, or tinted or otherwise coloured, preferably, the resin material used is one which provides a clear, transparent membrane on the surface of the panel construct.

The membrane can also be printed with a pattern, design, lettering or the like, or tinted to a desired colour such that when applied to the panel construct, the pattern, design, lettering or the like, is transferred to the surface of the panel construct.

It should also be noted that the application of the elastomeric resin-based membrane should not be limited to covering only the upper surface of the panel construct, and thus, additionally covering the bottom surface of the panel construct is not excluded in the practice of the present invention.

Preferably, the elastomeric resin material is in the form of a water-based dispersion or a water-based or solvent-based solution polymer. The elastomeric resin of the membrane, when cured, preferably has defined limits of elongation of 0-2000%, a 100% modulus between 0-1500 psi, and a tensile strength between 0-5000 psi, in accordance with ASTM D-412.

Preferred transfer film materials include plastic films, such as polyethylene or polypropylene films, Teflon films, polyethylene terephthalate (PET), polycarbonate, and the like, metal-based films, such as steel or aluminum foils, or paper-based films, such as paper, chemically-treated paper products, waxed paper products, and the like. Most preferably, the transfer film is a PET film, which can optionally be treated to alter its surface properties or features. The transfer film can be any suitable size, but preferably has a width and length which will later allow it to fully cover the selected panel construct. However, partial covering of the panel construct, is not excluded from the present invention.

Further, preferably, the transfer film is a material which is easily separated from the membrane, either before or after the membrane has been pressed onto the surface of the panel construct. Most preferably, the transfer film is a PET film since these films exhibit desirable release properties when used with polyurethane based resins.

The membrane covered transfer film can be produced in a batch process to produce sheets of the membrane materials. Preferably however, the membrane covered transfer film is continuously produced, by applying the resin material to a continuous roll of transfer film, drying the resin material, and rolling the resultant continuous roll into a roll of a desired length. The membrane covered transfer film can then be unrolled to supply the necessary or desired length of film, as needed.

A larger membrane sheet or roll might also be prepared, and cut to size, as needed. For example, a sheet could be cut in half, or a roll cut to provide two or more rolls of a narrower width.

The transfer film selected can have any suitable thickness, but preferably, has a thickness of between 1 mil (0.0254 mm) and 100 mil (2.54 mm), more preferably, between 2 mil (0.051 mm) and 30 mil (0.76 mm), and most preferably, a thickness of between 5 mil (0.127 mm) and 10 mil (0.254 mm). These ranges best balance the ability to press a texture onto the membrane, while permitting easy removal of the transfer film after pressing.

The transfer film can be any suitable colour, and might be opaque, translucent or transparent. Where the transfer film remains on the membrane covered panel during shipping and installation, the transfer films are preferably translucent or opaque coloured materials which will be easily seen on the membrane covered panel. The transfer film surface in contact with the membrane can also be smooth or textured so as to provide a smooth or textured surface to the membrane when the membrane covered panel construct is pressed with the transfer film still in place.

A pattern or text can also be printed on the transfer film so as to make it easier to see the transfer film, identify the product and/or assist in installation of the membrane covered panel. If the transfer film has been removed prior to pressing of the membrane covered panel construct, the membrane covered panel can be pressed to produce a smooth covering, or it can be pressed to produce a textured surface as described herein. However, the textured surface applied to the membrane can have a deeper texture, due to the possibility of having a thicker covering material layer.

Also, any existing texture on the panel construct can be removed in the pressed membrane, enhanced in the pressed membrane, or altered (e.g. by having texture applied in a different direction to that provided by the panel construct texture. Similarly, the application of the membrane of the invention as described herein can be used to correct or change the surface of the panel construct. For example, should the surface of the panel construct have small imperfections (e.g., impressions or raised areas), the present invention can result in removing those imperfections.

Once the membrane has been applied to the panel construct, it can be pressed to produce a smooth covering, or it can be pressed to produce a textured surface, as described herein. However, the textured surface applied to the membrane material can have a deeper texture, due to the possibility of having a thicker membrane layer.

Depending on the nature of the panel construct, and the nature of the resin material, the membrane covered panel construct is pressed, in a batch process, at pressures of between 5 to 90 kg/cm$^2$, more preferably between 10 and 80 kg/cm$^2$, and still more preferably at pressures of between 20 and 60 kg/cm$^2$. During pressing, the pressed panel is preferably heated at temperatures of between 50° C. and 250° C., more preferably between 100° C. and 220° C., and still more preferably, between 110° C. and 150° C. for a sufficient time period to allow the resin to cure, crosslink and bond to the panel construct.

Typically, this time period in the heated press, is less than 5 minutes, more preferably, less than 1 minute, and still more preferably, less than 30 seconds. Most preferably, the membrane covered panel is in the heated press for less than 15 seconds.

These conditions are typical of batch operations. Conditions in, for example, the heated calendaring roller of a continuous pressing operation will be similar to these temperatures and pressures, in order to effectively cure, crosslink and bond the membrane to the surface of the panel construct.

Other materials can also be included in the formulations of the present invention. For example, coupling agents, including silane compounds such as silane titanates, may also be included in the membrane formulation. Preferably, less than 1%, based on solids, of the weight of the resin formulation, and more preferably, less than 0.5%, of these agents, are used.

Other materials which might be added include surfactants or other surface modifying agents. Preferred surfactants include non-ionic surfactants, and preferably silicone-based surfactants including, for example, polysiloxane-polyoxyalkylene copolymers, and the like. The total amount of surfactants present is preferably between 0.1 and 10%, of solids, by weight of the resin formulation, and more preferably, between 1 and 6%, by weight. Most preferably, the weight of the surfactant is between 2 and 4% by weight of the resin formulation.

The membrane may also contain wear particles including ceramic particles, corundum or other aluminum oxide particles, or the like. Preferably, the particles are between 50 and 300 microns in size and are transparent after the pressing operation. This forms an abrasion resistant, covered panel. Thus, in one preferred approach, the elastomeric material includes abrasion resistant materials to enhance the durability of the re-coated layer, and thus act to provide an enhanced wear layer. Preferred abrasion resistant materials include aluminum oxides, such as corundum, ceramic particles, or the like. Any suitable amount of abrasion resistant particles can be used. However, typically, the preferred amount of abrasion resistant particles is such, so as to provide between 2 to 20 grams of particles per square meter, and more preferably between 3 to 12 grams per square meter. Additionally, particles of other sizes can be included to modify the scratch resistance of the treated panel.

A reaction catalyst or cross-linking agent can also be preferably added to the system, and preferably, these material used in this function is an amine based material, including, for example, primary, secondary or tertiary amines, or combinations thereof. The catalysts can also be metallic based materials, including, for example, tin, lead, or bismuth based catalysts, or the like. Suitable amine catalysts and crosslinking agents include, for example, triethylenediamine, N-methylmorpholine, tetramethyl-2,4-butanediamine, N-methylpiperazine, dimethylthanolamine, triethylamine, and the like, and organometallic compounds, such as stannous octanoate, dibutyltin dilaurate, dibutyltin di-2-ethylhexanoate, and the like. The catalysts and crosslinking agents may be used alone or in combination with one another. The amount of catalyst or crosslinkin agent typically ranges from 0.03 to 5.0 parts by weight on solids, and preferably between 0.1 to 3 parts by weight of solids, based on the total weight of the resin.

Release agents to aid in releasing the panel from the press, might also be included in the formulation. These can include silicone-based products, but more preferably, silicon-free agents including materials such as waxes, fluorine-based chemicals, polyvinyl alcohol based materials, and the like, are used. These materials are typically used at levels of between 0.1 and 5.0 parts, and more preferably, at levels of between 0.5 and 2 parts, by weight of solids based on the total weight of the resin. When the transfer film is left on the membrane during pressing, these release agents may, but not need be, eliminated.

Where other properties are desired, additional additives may be added to the composition including colorants, stains, dry or liquid inks or pigments, fire and flame retardants, smoke suppressants, internal mold release additives, blocking agents, UV protectants, anti-bacterial agents, anti-microbial agents, oliophobic materials, antistatic agents, flattening agents, and such other additives as required or desired.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
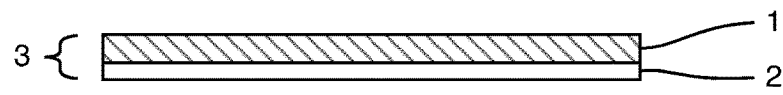
FIG. 1 is a side view of a PET transfer film with lower covering of an elastomeric resin membrane, as described in Example 1.

The novel features which are believed to be characteristic of the present invention, as to its structure, organization, use and method of operation, together with further objectives and advantages thereof, will be better understood from the following examples and figures in which a presently preferred embodiment of the invention will now be illustrated by way of example only. In the figures, like reference numerals depict like elements.

It is expressly understood, however, that the figures are for the purpose of illustration and description only and are not intended as a definition of the limits of the invention.

Also, unless otherwise specifically noted, all of the exemplified features described herein may be combined with any of the above aspects, in any combination. Also, it should be understood that the drawings are not to scale.

EXAMPLES

The examples described hereinbelow make reference to the drawings, and as such, reference numbers related to the figures are provided in the examples.

Example 1

A 5 mil PET transfer film (1) was covered with an aqueous dispersion of elastomeric resin-based material, comprised of a mixture of 125 g of WB420 (available from Purchem Systems Inc.), as a water-based elastomeric aliphatic polyurethane resin-based material having a solids content of 40% by weight, 7 g of WB475 (Purchem) of an 60% solids, water-based amine crosslinking agent, and 4 g of AD-200R (Purchem) as a 55% solids, aqueous fluoro-based release agent. The aqueous dispersion was applied to one side of the transfer film (1), as seen in FIG. 1, using a curtain coater, to create a 4 mil thick membrane (2) on the transfer film (1). Together, these components form a membrane covered transfer film (3).

While the dispersion can be applied in multiple layers, in this example, membrane (2) was applied to transfer film (1) as a single layer, and this single layer was dried in an oven at 80° C. for 3 minutes to remove moisture. The final weight of the membrane (2) on the transfer film (1) was 30 grams per square meter.

Figure 2:
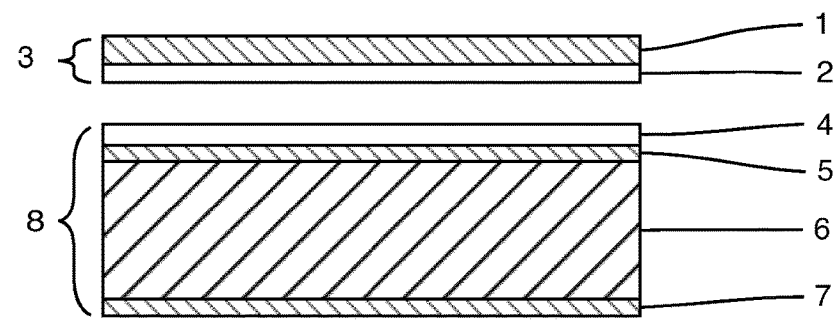
FIG. 2 is a side view of the membrane covered PET transfer film of FIG. 1, shown above a laminate floor panel which will be used as the panel construct.

The membrane covered transfer film (3) was placed over a flooring panel (8) which, in this example, is the panel construct intended for covering in the manner of the present invention, as shown in FIG. 2. Flooring panel (8) consists of a melamine impregnated overlay paper (4) which includes corundum particles; a melamine impregnated printed decor paper (5), an HDF panel (6), and a melamine impregnated balancing layer (7).

Figure 3:
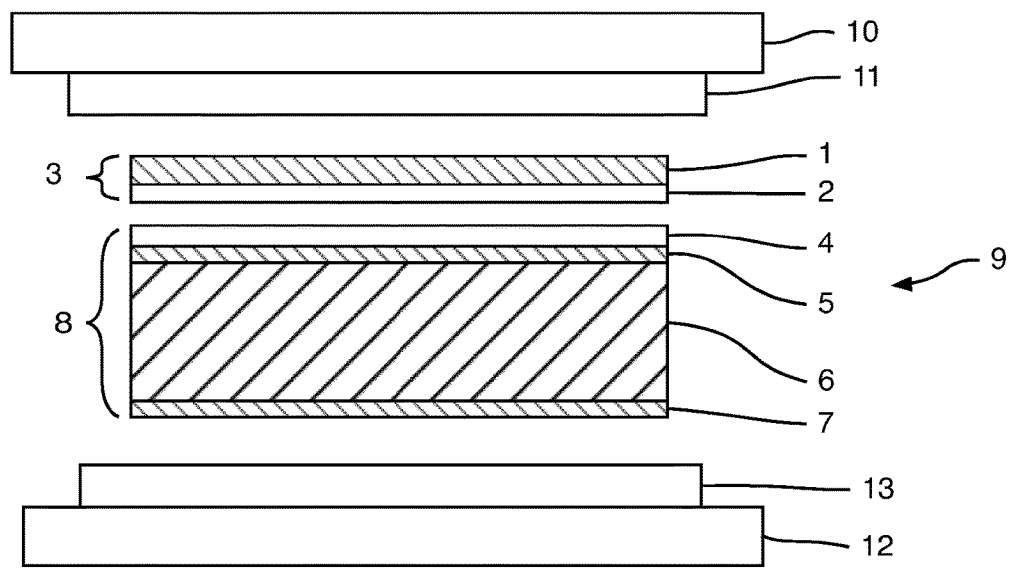
FIG. 3 is a side view of a the membrane covered PET transfer film and laminated flooring panel, shown in FIG. 2, in a press, prior to pressing.

The assembly consisting of the membrane covered transfer film (3) and flooring panel (8) was placed in a heated press (9), as shown in FIG. 3. Press (9) has an upper platen (10) with an upper press plate (11) and a lower platen (12) with a lower press plate (13). Both the upper and lower press plates (11, 13) are heated to a surface temperature of 200° C. The upper press plate (11) has a smooth surface texture (14).

The membrane covered PET transfer film (3) was placed so that the elastomeric resin based membrane (2) was adjacent to the upper surface of flooring panel (8), and this combination was pressed in press (9). The press pressure used was 45 kg/cm$^2$ and the press time was 15 seconds.

Figure 4:
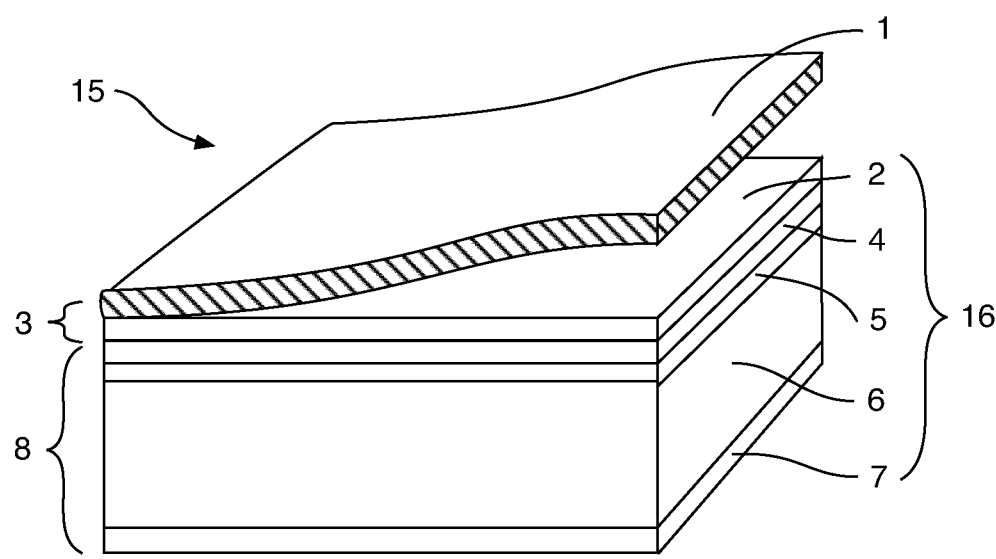
FIG. 4 is a perspective view of the membrane covered PET transfer film and laminated flooring panel of FIG. 3, after pressing.

After the press cycle was completed, the resultant hot panel (15) as shown in FIG. 4, was removed from the press and allowed to cool. In FIG. 4, the PET transfer film (1) is shown as being partially removed in order to expose a covered panel (16) consisting of a 3 mil thickness, smooth elastomeric resin-based membrane (2) on a prior art panel construct (8). The membrane provides the resultant panel with a soft elastomeric upper surface covering having excellent transparency.

Example 2

Figure 5:
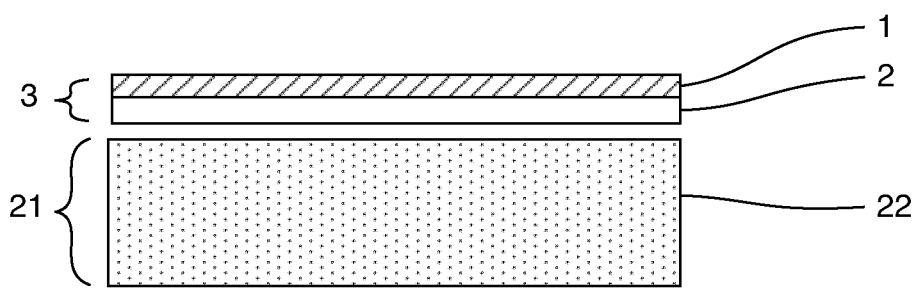
FIG. 5 is a side view of a PET transfer film with a lower covering of an elastomeric resin membrane, positioned to be pressed over an OSB panel construct.

The membrane covered transfer membrane (3) of Example 1 was used to cover a panel construct (21) consisting of an OSB pressboard material (22). The components are shown in FIG. 5. After pressing in a press, as described in Example 1, and removal of transfer film (1), an elastomeric membrane covered OSB board (not shown), having a soft upper surface, was produced.

Example 3

Figure 6:
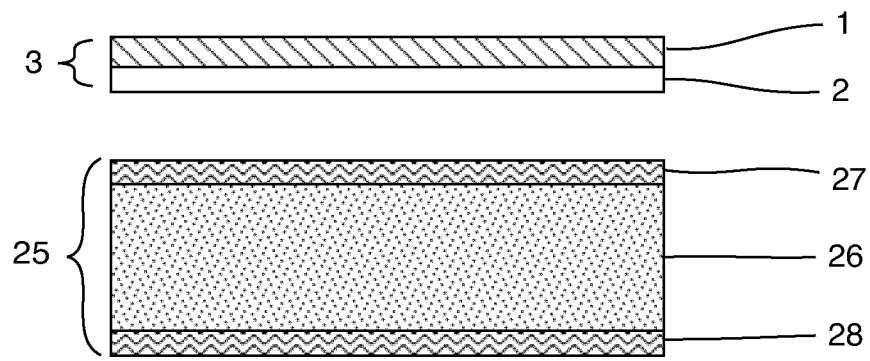
FIG. 6 is a side view of a PET transfer film with a lower covering of an elastomeric resin membrane, positioned to be pressed to a further panel construct consisting of a particleboard core layer, a melamine-based decorative paper, and a melamine-based backing layer.

The membrane covered transfer membrane (3) of Example 1 was used to cover a panel construct (25) consisting of a pre-formed panel consisting of a particleboard core layer (26), a melamine-based decorative paper layer (27), and a melamine-based backing layer (28). The components are shown in FIG. 6. After pressing in a press, as described in Example 1, and removal of transfer film (1), an elastomeric membrane covered decorative particleboard panel (not shown) suitable for use as a furniture panel, having a soft upper surface, was produced.

Example 4

Figure 7:
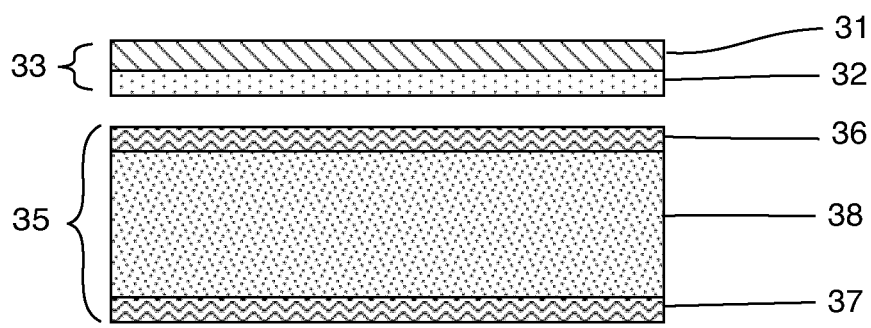
FIG. 7 is a side view of a PET transfer film with lower covering of an elastomeric resin membrane, positioned to be pressed over a panel construct consisting of a wood veneer layer, a particle board panel, and a wood veneer backer, to form an elastomeric membrane covered wood veneer furniture panel.

A 2 mil PET transfer film (31), as shown in FIG. 7, was covered with an aqueous dispersion of an elastomeric resin-based material, consisting of a mixture of 100 g of WB420 (available from Purchem Systems Inc.), as a water-based elastomeric aliphatic polyurethane, and 25 g of WB-100 (Purchem) as a second, more elastic, water-based aliphatic polyurethane, with both polyurethanes having a solids content of 40% by weight, 7 g of WB475 (Purchem) of an 60% solids, water-based amine crosslinking agent, 4 g of AD-200R (Purchem) as a 55% solids, aqueous fluoro-based release agent, and 10 parts by weight of 150 micron corundum particles, to form membrane (32). The aqueous dispersion was applied in two layers, to one side of the transfer film (31) using a roller coater. Each layer of the dispersion applied was dried in a lab oven at 80° C. for 3 minutes to remove moisture, and thus form membrane (32) on transfer film (31). Together, these items form a membrane covered transfer film (33) having a membrane covering, applied at a weight of 35 grams per square meter, which includes corundum particles.

The membrane covered transfer film (33) was placed over the upper surface of a previously prepared panel construct (35) consisting of upper wood veneer surface (36), and a lower wood veneer backing layer (37) bonded to a particleboard core (38), as shown in FIG. 7. The assembly was placed in a heated press with a surface temperature of 160° C. for both the upper and lower press plates. The PET covered transfer film (33) was placed so that the membrane covering material (32) contacts the upper wood veneer layer (36). The press pressure was set to 30 kg/cm$^2$ and the press time was set to 20 seconds.

After the press cycle was completed, the hot panel was removed from the press and allowed to cool. The PET transfer film (31) was removed from the upper and lower surfaces to expose a membrane covered, natural wood veneer panel (not shown), with a soft, abrasion resistant elastomeric upper surface covering having excellent transparency.

Example 5

Figure 8:
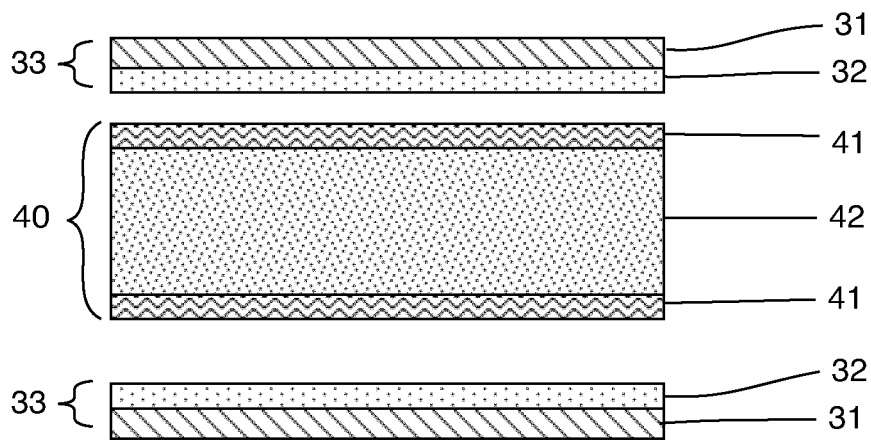
FIG. 8 is a side view of PET transfer films, with a covering of an elastomeric resin membrane, pressed over the upper and lower surfaces of a panel construct consisting of an upper and lower wood veneer layers on the surfaces of a particleboard panel.

The membrane covered transfer membrane (33) described in Example 4 was placed over the upper and lower surfaces of a pre-existing panel construct (40) consisting of upper and lower cork veneer surfaces (41) which have been bonded to a HDF core (42), as shown in FIG. 8.

The complete assembly was placed in a heated press which has a surface temperature of 110° C. for both the upper and lower press plates. The membrane covered transfer films (33) are placed so that the membrane (32) contacts the upper and lower wood veneer layers (41). The press pressure was set to 15 kg/cm$^2$ and the press time was set to 180 seconds.

After the press cycle was completed, the hot panel was removed from the hot press and placed in a cold press for 180 seconds to cool under pressure. The PET transfer film (31) was removed from the upper and lower surfaces, to expose a fully covered, natural cork veneer panel (not shown) with a soft, abrasion resistant elastomeric surface covering on both surface, and having excellent transparency.

Example 6

Figure 9:
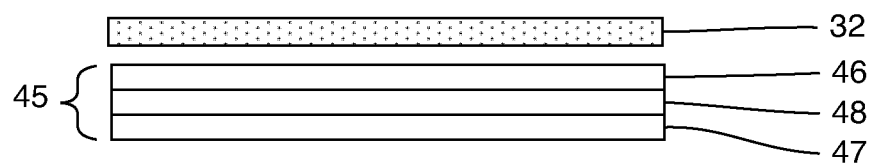
FIG. 9 is a side view of a PET transfer film with a lower covering of an elastomeric resin membrane, pressed over a panel construct consisting of a linoleum floor panel, in order to form an elastomeric resin membrane covered linoleum floor panel.

The membrane covered transfer film (33) described in Example 4, was prepared. In this example however, the transfer film (31) was peeled away from membrane (32) to leave only the membrane covering material. Membrane (32) was placed over a previously prepared panel construct (45) consisting of pre-existing panel having an upper linoleum surface (46) and a lower cork surface (47) bonded to a HDF core (48), as shown in FIG. 9.

The assembly was placed in a heated press with a surface temperature of 110° C. for both the upper and lower press plates. The upper press plate includes a wood-grain texture.

The membrane (21) was placed so as to contact the upper linoleum surface (31). The press pressure was set to 15 kg/cm$^2$ and the press time was set to 180 seconds.

After the press cycle was completed, the hot panel was removed from the hot press and placed in a cold press for 180 seconds to cool under pressure. The resultant panel (not shown) had a membrane covered, textured, upper linoleum panel surface with a soft, abrasion resistant elastomeric surface covering having excellent transparency.

Example 7

A PET transfer film (51) was covered with a membrane (52) in the manner described in Example 4. In this case, however, PET transfer film (51) has a textured surface (54) on one side of the film, and membrane (52) was formed on this side of film (51). Together, these items form a membrane covered transfer film (53).

Figure 10:
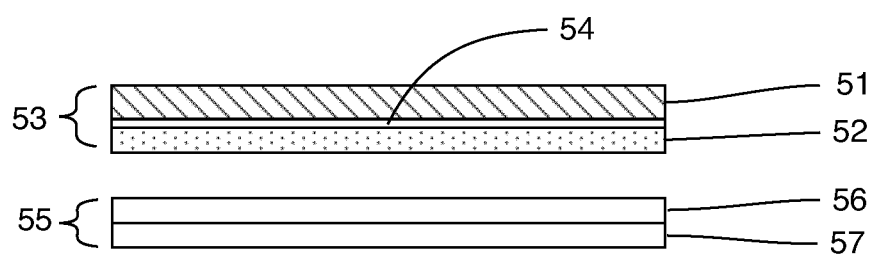
FIG. 10 is a side view of a PET transfer film with a lower covering of an elastomeric resin membrane, pressed over a panel construct consisting of a LVT layer over an HDF core, to form an elastomeric membrane covered LVT panel.

The membrane covered transfer film (53) was placed over a previously prepared panel construct (55) consisting of an LVT surface (56) bonded to a HDF core (57), as shown in FIG. 10.

The assembly was placed in a heated press with a surface temperature of 100° C. for both the upper and lower press plates. The upper press plate includes a smooth surface texture. The press pressure was set to 15 kg/cm$^2$ and the press time was set to 180 seconds.

After the press cycle was completed, the hot panel was removed and allowed to cool. The PET transfer film was removed to expose a fully covered, textured, LVT panel surface with a soft, abrasion resistant elastomeric surface covering and excellent transparency.

Example 8

Figure 11:
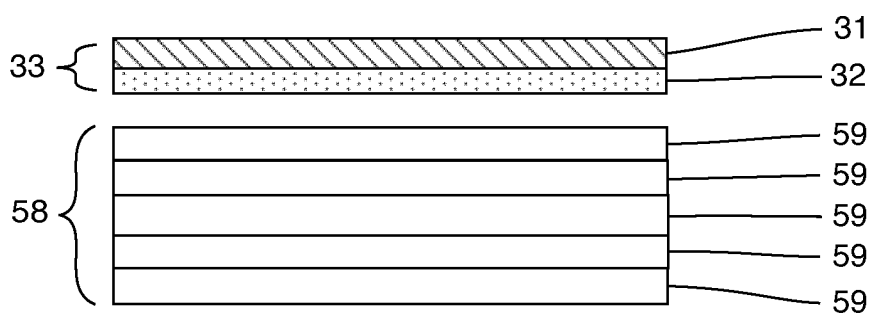
FIG. 11 is a side view of a PET transfer film with a lower covering of an elastomeric resin membrane, pressed over a panel construct consisting of a 5-ply plywood panel.

The membrane covered transfer film (33) described in Example 4, was prepared. The membrane covered transfer film (33) was placed over a previously prepared plywood panel construct (58) having five plies of a wood layers (59), as shown in FIG. 11.

The assembly was placed in a heated press with a surface temperature of 100° C. for both the upper and lower press plates. The upper press plate includes a smooth surface texture. The press pressure was set to 15 kg/cm$^2$ and the press time was set to 180 seconds.

After the press cycle was completed, the hot panel was removed and allowed to cool. The PET transfer film was removed to expose a smooth plywood panel having a soft, abrasion resistant elastomeric surface covering and excellent transparency.

Example 9

Figure 12:
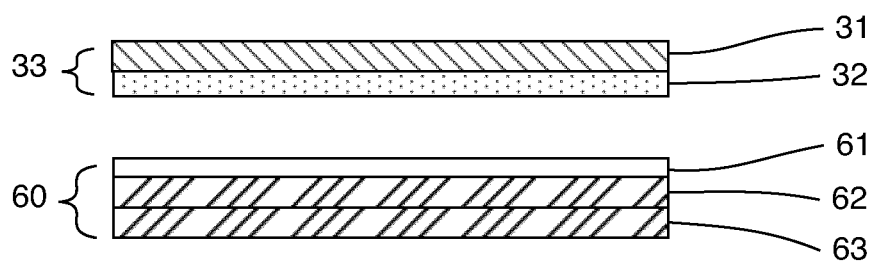
FIG. 12 is a side view of a PET transfer film with a lower covering of an elastomeric resin membrane, pressed over a panel construct consisting of an HPL panel having a melamine décor layer, a kraft paper layer treated with phenolic resin and a second kraft paper layer treated with phenolic resin, to form an elastomeric resin membrane covered HPL panel.

The membrane covered transfer film (33) described in Example 4, was again prepared, and placed over a previously prepared HPL panel as panel construct (60) consisting of a melamine decor layer (61), a kraft paper layer treated with phenolic resin (62) and a second kraft paper layer (63) treated with phenolic resin, as shown in FIG. 12.

The assembly was placed in a heated press with a surface temperature of 110° C. for both the upper and lower press plates. The upper press plate includes a wood-grain texture. The membrane (21) was placed so as to contact the upper décor layer surface (51). The press pressure was set to 15 kg/cm$^2$ and the press time was set to 180 seconds.

After the press cycle was completed, the hot panel was removed from the hot press and placed in a cold press for 180 seconds to cool under pressure. The resultant panel had a membrane covered, textured, upper surface with a soft, abrasion resistant elastomeric surface covering having excellent transparency.

Example 10

An aqueous dispersion of a mixture of 100 g of ENCOR 2173, available from Arkema, as a water-based acrylic, and having a solids content of 40%, was mixed with 5 g of WB475 (Purchem) of an 60% solids, water based amine crosslinking agent, and 3.5 g of AD-200R (Purchem) as a 55% solids, aqueous fluoro-based release agent, was prepared by spray coating the liquid material on to a 6 mil polyethylene transfer film.

The resultant acrylic membrane was placed over a previously prepared panel construct consisting of a pre-existing, prior art flooring panel consisting of a melamine impregnated overlay paper which includes corundum particles, a melamine impregnated printed decor paper, an HDF panel, and a melamine impregnated balancing layer. The structure of this assembly was similar to that shown in FIG. 2.

The assembly was placed in a heated press with a surface temperature of 140° C. for both the upper and lower press plates. The upper press plate includes a wood-grain texture. The membrane was placed so as to contact the upper laminated flooring panel surface. The press pressure was set to 15 kg/cm$^2$ and the press time was set to 180 seconds.

After the press cycle was completed, the hot panel was removed from the hot press and placed in a cold press for 180 seconds to cool under pressure. The resultant panel had an acrylic membrane covered, textured, upper panel surface with a soft, abrasion resistant elastomeric surface covering having excellent transparency.

Figure 13:
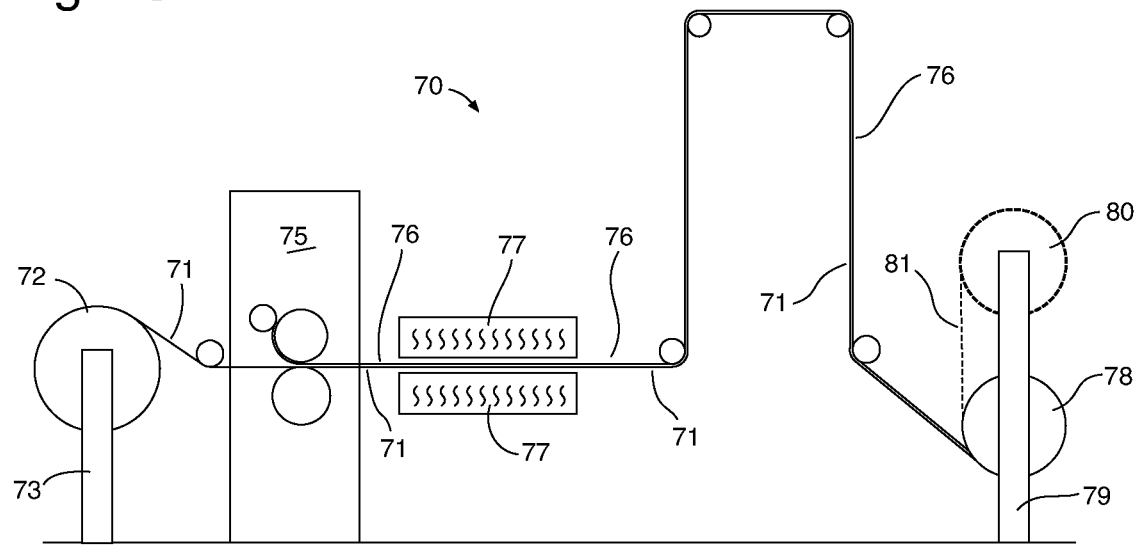
FIG. 13 is a schematic view of a production line which can be used to continuously produce the PET transfer film with a covering of an elastomeric resin membrane.

In FIG. 13, an exemplary illustration of one possible approach to produce the membrane cover transfer film, as shown in FIG. 1, is provided. In FIG. 13, a production assembly (70) is shown having a PET transfer film (71) shown in a roll (72) supported on a stand (73). Film (71) is fed from roll (72) and travels through a roller coater (75) wherein an aqueous layer of an elastomeric based resin material, such as the formulation described in Example 1, 4 or 10, is applied to one surface of film (71), and thus provide a membrane (76) on one side of film (71). Membrane covered film (71, 76) passes through a drying oven (77) to dry off the water from the solution. Membrane covered film (71, 76) is then fed through several idler rollers in order to to aid in drying membrane (76) and to cool the membrane covered film (71, 76). At this stage, the cooled, dry membrane covered film (71, 76) is rolled onto a finished roll (78) positioned on a second stand (79).

If desired, an optional roll of paper (80) can be provided so that a paper layer (81) can be inserted between the layers of the membrane covered film (71, 76) in roll (78).

Figure 14:
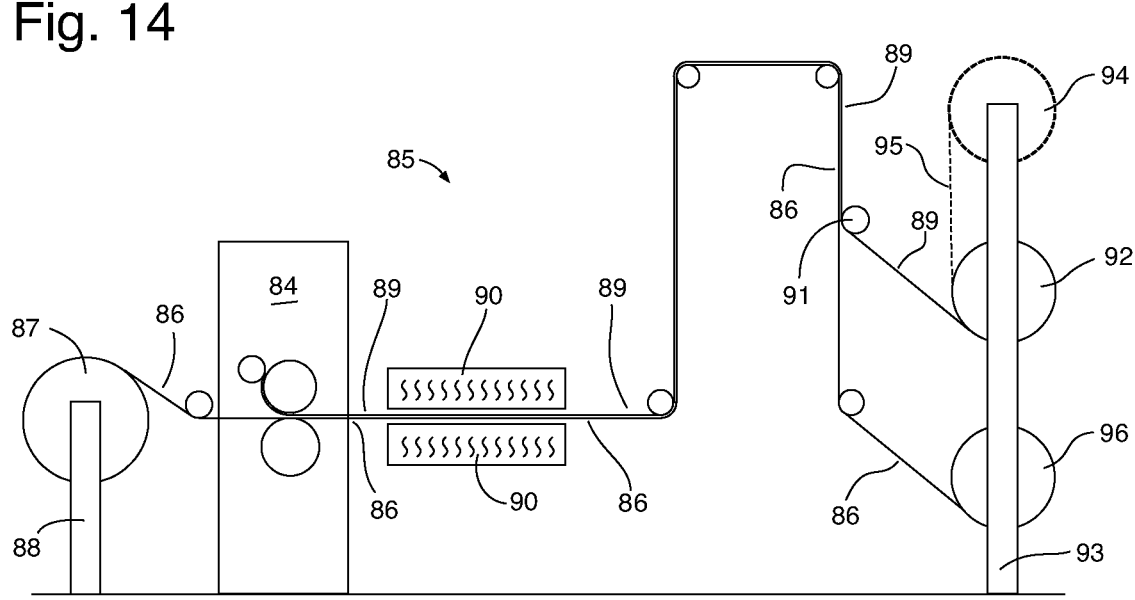
FIG. 14 is a schematic view of a continuous production line used to produce a roll of an elastomeric resin membrane.

In FIG. 14, an exemplary illustration of one possible approach to produce the membrane cover material, as shown in FIG. 9, is provided. In FIG. 14, a production assembly (85) is shown having a PET transfer film (86) shown in a roll (87) supported on a stand (88). Film (86) is fed from roll (87) and travels through a roller coater (84) wherein an aqueous layer of an elastomeric based resin material, such as the formulation described in Example 1, 4 or 10, is applied to one surface of film (86), and thus provide a membrane (89) on one side of film (86). Membrane covered film (86, 89) passes through a drying oven (90) to dry off the water from the solution. Membrane covered film (86, 89) is then fed through several idler rollers in order to to aid in drying membrane (89) and to cool the membrane covered film (86, 89).

At this stage, the cooled, dry membrane covered film (86, 89) is fed to roller (91), and membrane (89) is peeled from film (86). Peeled membrane (89) is fed to a finished product roll (92) positioned on a second stand (93).

Again, if desired, an optional roll of paper (94) can be provided so that a paper layer (95) can be inserted between the layers of the membrane (89) in roll (92).

After membrane (89) is peeled from film (86), the film (86) can be rolled onto a further roller (96). This collected roll (96) of transfer film (86) can be re-used, and can later be used as transfer film roll (87) for subsequent operations.

Thus, it is apparent that there has been provided, in accordance with the present invention, a process for producing a membrane covered panel construct which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Unless otherwise specifically noted, all of the features described herein may be combined with any of the above aspects, in any combination.

Additionally, for clarity and unless otherwise stated, the word "comprises" and variations of the word such as "comprising" and "comprises", when used in the description and claims of the present specification, is not intended to exclude other additives, components, integers or steps. It will also be understood that the term "comprising", or the like, can be replaced by the phrase "consisting of" or by the phrase "consisting essentially of" so that the claims can be limited to the exact formulations described in the description or claims, without additional materials being present.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

We claim:

1. A process for the production of a covered panel, the process comprising:
    applying a membrane to a panel construct to form a membrane covered panel construct wherein said membrane is adjacent to a surface of said panel construct,
    said membrane having been formed by:
        applying a liquid elastomeric resin-based material to a transfer film to form a liquid film on the transfer film; and
        drying said liquid film so as to form said membrane on said transfer film; and
    pressing the membrane covered panel construct under conditions of heat and pressure to cure said elastomeric resin-based material and bond said membrane to said panel construct, wherein the pressing step is carried out in a batch pressing device or in a continuous pressing device, and wherein the pressing device has a textured surface which is transferred to the surface of the membrane covered panel construct in the pressing step,
    wherein said membrane is removably attached to said transfer film, said elastomeric resin-based material is a solution or dispersion of an elastomeric resin in a solvent, said elastomeric resin-based material is based on at least one of a resin selected from polyurethane, ethylene vinyl acetate, ethylene vinyl alcohol, polyester, polyolefin, melamine, ethylene styrene, styrene acrylic, rubber based material, and latex, said transfer film is a film material which temporarily adheres to the membrane, both before and after the pressing operation, said transfer film can be peeled, or otherwise removed from the membrane without any damage to the membrane or the transfer film, the panel construct is a decorative panel, and the decorative panel is a flooring panel, a a countertop panel or a wall panel.

2. The process as claimed in claim 1, wherein said elastomeric resin-based material is a water based, ultraviolet (UV)-resistant, aliphatic polyurethane resin.

3. The process as claimed in claim 1, wherein said elastomeric resin-based material is applied to said transfer film, using a technique selected from spray coating, roller coating, curtain coating, and dip coating.

4. The process as claimed in claim 1, wherein said membrane is produced from one or more layers of the elastomeric resin-based material and any or all of said one or more layers are dried after application at a temperature of less than 130° C. for a time period between 30 seconds and 5 minutes in order to avoid or minimize any curing of the applied elastomeric resin-based material.

5. The process as claimed in claim 1, wherein the membrane covered panel construct is heated and pressed in a press at pressures between 10 to 80 kg/cm$^2$ at a temperature of between 100° C. and 220° C. for a time period of less than 2 minutes.

6. The process as claimed in claim 1, wherein said transfer film is not removed from said membrane covered panel until after installation or use of said membrane covered panel.

7. The process as claimed in claim 1, wherein said panel construct is selected from particleboard, medium density fibreboard board, high density fibreboard board, oriented strand board, a multi-layer glued wood veneer applied to a wood panel, a multi-layer glued wood veneer applied to a composite panel, a laminated panel, a panel having a core layer to which a surface layer of cork has been applied, linoleum, pressed wood powder, a high pressure laminate, a polyvinyl chloride (PVC) based panel, a panel produced by direct printing of a pattern directly on to the upper surface of another panel, a panel construct based on panels having a core material comprised of one of more layers of a plastic material, a luxury vinyl tile, a vinyl plank, and a wood plastic composite.

8. The process as claimed in claim 1, wherein said panel construct is a solid wood plank or board, a metal panel, a glass panel, a ceramic or porcelain panel, or a plastic panel.

9. The process as claimed in claim 1, wherein the thickness of said membrane applied to said panel construct is from 1 micron to 3 mm, and wherein said membrane is applied to said panel construct at a level of from 3 to 150 grams per square meter after drying.

10. The process as claimed in claim 1, wherein said membrane contains wear particles selected from ceramic particles, and aluminum oxide particles, and said wear particles are between 50 and 300 microns in size and are transparent after the pressing operation.

11. The process as claimed in claim 1, wherein said resin-based material additionally comprises one or more of a coupling agent, a surfactant, a surface modifying agent, a release agent, and an amine based reaction catalyst or cross-linking agent, said resin-based material additionally comprises one or more of a colorant, a stain, a dry ink, a liquid ink, a pigment, a fire retardant, a flame retardant, an internal mold release additive, a UV protectant, an anti-bacterial agent, an antimicrobial agent, an oleophobic material, an antistatic agent and a flattening agent.

12. The process as claimed in claim 1, wherein the membrane covered panel construct is heated and pressed in a press at pressures of between 20 and 60 kg/cm² at a temperature of between 110° C. and 150° C., for a time period of less than 30 seconds.

13. The process as claimed in claim 1, wherein the thickness of said membrane applied to said panel construct is from 1 micron to 3 mm, and wherein said membrane is applied to said panel construct at a level between 5 and 100 grams per square meter after drying.

14. The process as claimed in claim 1, wherein the thickness of said membrane applied to said panel construct is from 1 micron to 3 mm, and wherein said membrane is applied to said panel construct at a level between 40 and 80 grams per square meter after drying.

15. The process as claimed in claim 1, wherein the decorative panel is the flooring panel.

16. The process as claimed in claim 1, wherein the decorative panel is the wall panel.

17. The process as claimed in claim 1, wherein the decorative panel is the furniture panel.

18. The process as claimed in claim 1, wherein the decorative panel is the countertop panel.

* * * * *